(12) United States Patent
Jeol et al.

(10) Patent No.: US 9,938,377 B2
(45) Date of Patent: *Apr. 10, 2018

(54) POLYAMIDE, PREPARATION PROCESS THEREFOR AND USES THEREOF

(71) Applicant: RHODIA OPERATIONS, Paris (FR)

(72) Inventors: Stéphane Jeol, Cumming, GA (US); Floryan Decampo, Milan (IT); Leon Zhu, Shanghai (CN)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,923

(22) Filed: Apr. 27, 2017

(65) Prior Publication Data

US 2017/0226286 A1    Aug. 10, 2017

Related U.S. Application Data

(63) Continuation of application No. 14/416,935, filed as application No. PCT/EP2013/064581 on Jul. 10, 2013, now Pat. No. 9,670,319.

(30) Foreign Application Priority Data

Jul. 20, 2012  (WO) ............... PCT/CN2012/078918

(51) Int. Cl.
*C08G 69/26* (2006.01)
*C08G 69/28* (2006.01)

(52) U.S. Cl.
CPC ............ *C08G 69/26* (2013.01); *C08G 69/28* (2013.01)

(58) Field of Classification Search
CPC ............................... C08G 69/28; C08G 69/26
See application file for complete search history.

(56) References Cited

U.S. PATENT DOCUMENTS 4,395,531 A    7/1983  Toyoda et al.

OTHER PUBLICATIONS

Fehrenbacher, U et al.: "Synthese und Charakterisierung von Polyestern und Polyamiden auf der Basis von Furan-2,5-dicarbonsäure", Chemie Ingenieur Technik, Wiley VCH. Verlag, Weinheim; DE, vol. 81, No. 11, Nov. 1, 2009, pp. 1829-1835.
Moore J A et al: "Polyesters derived from Furan and Tetrahydrofuran Nuclei", Macromolecules, American Chemical Society, Washington, DC; US, vol. 11, No. 3, Jan. 1, 1978, pp. 568-573.

*Primary Examiner* — Michael Pepitone

(57) ABSTRACT

The present disclosure relates to a novel polyamide synthesized from biobased monomers. The novel polyamide comprises the repeating unit of formula I, described herein, in which R represents a covalent bond or a divalent hydrocarbon-based group chosen from saturated or unsaturated aliphatics, saturated or unsaturated cycloaliphatics, aromatics, arylaliphatics and alkylaromatics. The present disclosure also relates to a process for preparing the said polyamide, to its uses, and to articles and compositions comprising the said polyamide.

12 Claims, No Drawings

POLYAMIDE, PREPARATION PROCESS THEREFOR AND USES THEREOF

This application is a continuation of U.S. application Ser. No. 14/416,935, filed Jan. 23, 2015 know U.S. Pat. No. 9,670,319), which is a U.S. national phase entry under 35 U.S.C. § 371 of International Application No. PCT/EP2013/064581, filed on Jul. 10, 2013, which claims the priority of International Application No. PCT/CN2012/078918, filed on Jul. 20, 2012. The entire contents of these applications are being incorporated herein by reference for all purposes.

The present invention relates to a novel polyamide, to a process for preparing it and to its uses. The invention more particularly relates to a polyamide synthesized from biobased monomers.

The term "biobased" means that the material in question is derived from renewable resources. A renewable resource is a natural—animal or plant—resource whose stock can be reconstituted over a short period on a human timescale. It is in particular necessary for this stock to be able to be renewed as quickly as it is consumed.

Unlike materials derived from fossil materials, renewable starting materials contain a large proportion of $^{14}C$. This characteristic may especially be determined via one of the methods described in standard ASTM D6866, especially according to the mass spectrometry method or the liquid scintillation spectrometry method.

These renewable resources are generally produced from cultivated or non-cultivated vegetable matter such as trees, plants such as sugarcane, corn, cassava, wheat, rapeseed, sunflower, palm, castor-oil plant or the like, or from animal matter such as fats (tallow, etc.).

Polymers synthesized from biobased monomers are of major interest nowadays since they make it possible to reduce the environmental footprint. There are a large number of combinations of biobased monomers or of combinations of monomers that are biobased and derived from fossil resources, which may be used to generate polymers that are then termed biobased. Some of these biobased polymers may be used to replace polymers derived from fossil resources. This is the case, for example, for polyamide PA 6.10, synthesized from hexamethylenediamine (fossil resource) and from biobased sebacic acid derived from castor oil, which can replace PA 12 (derived from fossil resources) especially in motor vehicle applications.

Among the biobased monomers, there is great interest in 2,5-furandicarboxylic acid, obtained, for example, from hydroxymethylfurfural (HMF), which is itself obtained, for example, from sugars, such as glucose.

2,5-Furandicarboxylic acid is especially used in direct replacement for terephthalic acid, derived from fossil resources, and in combination with diols such as ethylene glycol, 1,3-propanediol or 1,4-butanediol, to synthesize semi-crystalline polyesters that have excellent properties, whether for wrapping or textile applications. Thus, polyethylene furanoate (PEF) may be used instead of polyethylene terephthalate (PET) for the production of bottles.

Industrially, polyesters of the PET type are mainly synthesized via a direct esterification route between terephthalic acid and diols.

However, modifications of these industrial units prove to be necessary in order to synthesize high-quality PEFs, since, in the course of this reaction, the 2,5-furandicarboxylic acid degrades into furan, which is a toxic, carcinogenic and flammable molecule.

It is therefore more judicious to perform the synthesis of PEFs according to another industrial route for the manufacture of PETs from dimethyl terephthalates. When applied to PEFs, this "diester" route is the reaction between dimethyl 2,5-furanoate and an excess of diol, the excess of diol being removed by distillation under vacuum to make the polyester chains grow.

Semi-crystalline polyamides such as PA 66, PA 6, PA 11, PA 12 and PA 46 or polyphthalamides PA 6T/66, PA 6T/MT and PA 6T/6I, PA 10T and PA 9T are technical polymers that are widely used in applications such as motor vehicles, textiles or in the electrical and electronics (E&E) sector. They constitute the vast majority of the polyamides sold worldwide. Amorphous polyamides are, for their part, more marginal since the amorphous nature often limits the application performances and the working temperature range.

Polyamides have also been synthesized from 2,5-furandicarboxylic acid especially for the purpose of replacing terephthalic acid with a biobased monomer. In contrast with polyesters derived from 2,5-furandicarboxylic acid, it appears, from a recent study by Ulrich Fehrenbacher published in Chemie Ingenieur Technik (Polymere) 2009, 81, 11, 1829-1835, that the polyamides made from the methyl diester derivative of 2,5-furandicarboxylic acid and from biobased commercial diamines (e.g. 1,10-diaminodecane) or derived from fossil resources (e.g. hexamethylenediamine or 1,12-diaminododecane) are amorphous.

This characteristic represents a curb on the development of polyamides from 2,5-furandicarboxylic acid, since they cannot replace the semi-crystalline polyamides derived from fossil resources.

Furthermore, as for polyesters, the use of 2,5-furandicarboxylic acid for polyamide manufacture should be avoided since it generates furan, which is toxic.

Another curb on the development of these polyamides is the recourse to a "diester aminolysis" process, i.e. a process that consists in reacting a diamine with a diester. Specifically, such a process has two major drawbacks, in contrast with the case of the polyesters synthesized via the "diester" route. The first drawback is the appearance of side reactions that have an impact on the thermal properties (for example the crystallization) of the polyamides. The second drawback is that it is necessary to work with a stoichiometric amount of diamine and of diester in order to obtain polyamides of high molar masses. However, it is difficult to control this stoichiometric amount of diamine and of diester from an industrial point of view.

There is thus still a need to propose novel polyamides, which are preferably semi-crystalline, derived from biobased molecules, which can replace the polyamides derived from fossil resources.

Furthermore, there is also a need to find a synthetic route for these biobased polyamides that is simple, clean and reproducible and that advantageously uses the industrial equipment already in place for standard polyamides such as polyamide 66. Furthermore, the manufacturing process for synthesizing these polyamides should advantageously make it possible to achieve high molar masses.

In this context, it has been discovered, entirely surprisingly, that diacids or derivatives which contain a tetrahydrofuran ring make it possible, especially in combination with diamines, to synthesize novel polyamides that have particularly advantageous properties in the usual applications of polyamides. These diacids or derivatives, which are advantageously biobased, may be obtained especially from biobased 2,5-furandicarboxylic acid.

One subject of the invention is thus a novel polyamide comprising the repeating unit of formula I below:

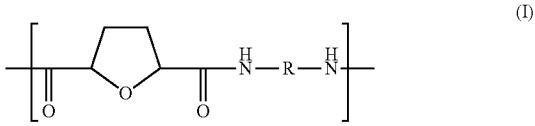

in which

R represents a covalent bond or a divalent hydrocarbon-based group chosen from saturated or unsaturated aliphatics, saturated or unsaturated cycloaliphatics, aromatics, arylaliphatics and alkylaromatics.

A subject of the invention is also a process for preparing the polyamide of the invention, which comprises a polycondensation reaction between:

at least one dicarboxylic acid or at least one carboxylic acid diester or at least one dinitrile or at least one acyl dichloride of respective formulae IV, IV', IV" and IV''' below:

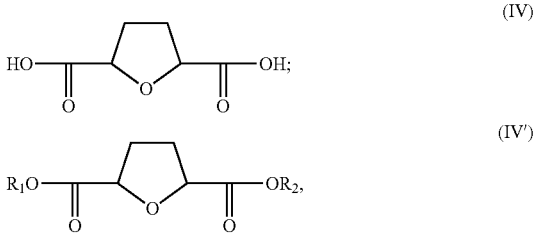

where $R_1$ and $R_2$, which are identical or different, are C1-C4 alkyls;

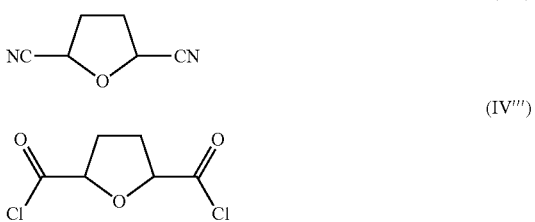

and
at least one diamine of formula V below:

$$H_2N-R-NH_2 \quad (V)$$

with R as defined above.

Furthermore, a subject of the invention is the use of the polyamide of the invention for preparing articles by moulding, injection moulding, injection/blow-moulding, extrusion/blow-moulding, extrusion or spinning. The present invention is thus also directed towards articles obtained from the polyamide according to the invention, the said articles being able to take the form of moulded or extruded pieces, yarns, fibres, filaments or films.

The articles thus obtained have applications in numerous fields such as technical plastics (motor vehicle, E&E, consumer goods, etc.), industrial yarns, the textile industry, packaging, etc.

The present invention also relates to compositions comprising at least the polyamide of the invention and optionally reinforcing fillers and/or various additives.

The novel polyamide according to the invention comprises a repeating unit of formula I as described above in which R represents a covalent bond or a divalent hydrocarbon-based group chosen from saturated or unsaturated aliphatics, saturated or unsaturated cycloaliphatics, aromatics, arylaliphatics and alkylaromatics.

The term "saturated aliphatic group" means, for example, linear or branched alkyl groups having from 1 to 36 carbon atoms. Preferably, a linear alkyl group having from 4 to 14 carbon atoms will be chosen.

The term "unsaturated aliphatic group" means, for example, that the invention does not exclude the presence of an unsaturation on the aliphatic hydrocarbon-based chain, such as one or more double bonds that may or may not be conjugated, or alternatively a triple bond.

The hydrocarbon-based chain of the above aliphatic groups may optionally be interrupted with a heteroatom (for example oxygen, nitrogen, phosphorus or sulphur) or a functional group (for example carbonyl) or may bear one or more substituents (for example hydroxyl or sulphone) provided that they do not interfere under the reaction conditions or with regard to the intended application.

As preferred examples for the aliphatic groups R, mention may be made of the following groups: $-(CH_2)_4-$, $-(CH_2)_5-$, $-(CH_2)_6-$, $-(CH_2)-CH(CH_3)-(CH_2)_3-$, $-(CH_2)_{10}-$ and $-(CH_2)_{12}-$.

In formula (I), R may also represent a cycloaliphatic (or carbocyclic) group, which is preferably monocyclic or bicyclic. The number of carbon atoms in each ring may range from 4 to 8 carbon atoms, but it is preferably equal to 4, 5 or 6 carbon atoms. The carbocycle may be saturated or may comprise 1 or 2 unsaturations in the ring, preferably 1 to 2 double bonds.

As preferred examples of carbocyclic and monocyclic groups for A, mention may be made of the 1,4-cyclohexyl or 1,3-cyclohexyl group, preferably the trans stereoisomer or else the 4,4'-methylenebis(cyclohexyl) group.

In other advantageous embodiments of the invention, R may also represent an aromatic divalent hydrocarbon-based group comprising, advantageously, at least 5 carbon atoms in its aromatic ring, which may be interrupted with a heteroatom such as a nitrogen atom. Preferably, the divalent aromatic hydrocarbon-based group comprises from 6 to 18 carbon atoms, such as a 1,4-benzene, 1,3-benzene or 2,6-naphthalene group. It may also be a divalent alkylaromatic hydrocarbon-based group such as 1,4-phenylene-2,5-dimethyl, or a divalent arylaliphatic hydrocarbon-based group such as the group $-(CH_2)_n$-Ph-$(CH_2)_{n'}-$ with n and n' being integers advantageously between 1 and 4 and the positions of the $-(CH_2)_n-$ groups are 1.3 and 1.4. As preferred examples for the aromatic groups R, a 1,4-benzene, 1,3-benzene or $-(CH_2)$-Ph-$(CH_2)-$ group in positions 1.3 and 1.4 will be chosen.

According to one particular embodiment of the invention, R is a divalent hydrocarbon-based group that is biobased in the sense of the present invention (standard ASTM D6866).

According to one preferred embodiment of the invention, the polyamide of the invention has a true number-average molar mass Mn of between 500 and 50 000 g/mol, preferably between 2000 and 30 000 g/mol and even more preferentially between 5000 and 25 000 g/mol.

The true number-average molar masses are determined by various known methods such as gel permeation chromatography. The term "true number-average molar masses" should be understood as meaning that they are not measurements as polystyrene equivalents.

According to a first advantageous embodiment, the polyamide according to the invention predominantly comprises the repeating unit of formula I. This repeating unit of formula I is advantageously derived from the polycondensation reaction between a dicarboxylic acid monomer of formula IV as defined above and a diamine monomer of formula V: $H_2N$—R—$NH_2$ (V) with R as defined above. As explained previously, the dicarboxylic acid may also be substituted with a corresponding methyl, ethyl, propyl or butyl diester (formula IV') or alternatively with a corresponding dinitrile (formula IV"), or alternatively an acyl chloride (formula IV'").

The term "predominantly" means that the polyamide may be a homopolyamide consisting entirely of the repeating unit of formula I, but also that it may be a copolymer comprising other repeating units different from the unit of formula I, these repeating units possibly being derived from comonomers such as other dicarboxylic acids, other diamines, amino acids and/or lactams. These comonomers may represent up to 50 mol %, preferably up to 30 mol % and even more preferentially up to 15 mol % of the total amount of monomers introduced for the preparation of the polyamide of the invention.

According to a second advantageous embodiment, the polyamide according to the invention comprises to a minor extent the repeating unit of formula I. This repeating unit of formula I is advantageously derived from the polycondensation reaction between a dicarboxylic acid monomer of formula IV as defined above and a diamine monomer of formula V: $H_2N$—R—$NH_2$ (V) with R as defined above. As explained previously, the dicarboxylic acid may also be substituted with a corresponding methyl, ethyl, propyl or butyl diester (formula IV') or alternatively with a corresponding dinitrile (formula IV"), or alternatively an acyl chloride (formula IV'").

The term "to a minor extent" means that the polyamide is a copolymer comprising other repeating units different from the unit of formula I, these repeating units possibly being derived from monomers such as other dicarboxylic acids, other diamines, amino acids and/or lactams. These other monomers may in that case represent up to 95 mol %, preferably up to 70 mol %, of the total amount of monomers introduced for the preparation of the polyamide of the invention. In other words, the precursor monomers of the repeating unit of formula I may in that case represent up to 5 mol %, preferably up to 30 mol %, of the total amount of monomers introduced for the preparation of the polyamide of the invention. The copolymer in question may be, for example, PA 6T/6TF, PA10T/10TF, PA6T/6TF/66, PA66/6TF, PA12T/12TF and PA610/6TF, in the proportions described above.

Copolymer of the present invention may be chosen in group consisting of: PA 6T/6TF, PA10T/10TF, PA6T/6TF/66, PA66/6TF, PA12T/12TF and PA610/6TF.

The dicarboxylic acid monomers of formula IV, diester monomers of formula IV', dinitrile monomers of formula IV" and acyl dichloride monomers of formula IV'" may be the cis or trans stereoisomers or a mixture thereof. Preferably, the trans stereoisomer will be chosen. For the cis stereoisomer, the chiral carbons in positions 2 and 5 may be R,S or S,R or a meso mixture. For the trans stereoisomer, the chiral carbons in positions 2 and 5 may be S,S or R,R or the racemic mixture.

The diacids of formula IV, which are advantageously biobased, may be synthesized, for example, by catalytic hydrogenation, for example with Raney nickel, from 2,5-furandicarboxylic acid (FDCA) or the methyl diester of that acid, followed by a hydrolysis.

The diesters of formula IV', which advantageously are biobased, may be synthesized, for example, by esterification of THFDCA (diacid of formula IV) with a monoalcohol such as methanol, ethanol, propanol or butanol or by esterification of FDCA with a monoalcohol such as methanol, ethanol, propanol or butanol, followed by catalytic hydrogenation, for example with Raney nickel.

The dinitriles of formula IV", which advantageously are biobased, may be synthesized, for example, by nitrilation of THFDCA (diacid of formula IV) with ammonia.

The acyl dichlorides of formula IV'", which advantageously are biobased, may be obtained, for example, from the reaction of THFDCA (diacid of formula IV) with thionyl chloride.

The processes for obtaining these various monomers are conventional processes which are known to a person skilled in the art.

These monomers are particularly advantageous because they are able to confer a semi-crystalline character on the polyamides of the invention.

The diamine monomers of formula V are advantageously chosen from: hexamethylenediamine; 1,4-diaminobutane; 1,5-diaminopentane; 2-methyl-1,5-diaminopentane; 2-methylhexamethylenediamine; 3-methylhexamethylenediamine; 2,5-dimethylhexamethylenediamine; 2,2-dimethylpentamethylenediamine; 1,7-diaminoheptane, 1,8-diaminooctane; 1,9-diaminononanediamine; 2-methyl-1,8-octanediamine, 5-methylnonanediamine, 1,10-diaminodecane; 1,11-diaminoundecane; 1,12-diaminododecane; 2,2,4- and 2,4,4-trimethylhexamethylenediamine; 2,2,7,7-tetramethyloctamethylenediamine; meta-xylylenediamine; para-xylylenediamine; isophoronediamine; 4,4'-diaminodiphenylmethane; 4,4'-methylenebis-(cyclohexylamine); 1,3-bis(aminomethyl) cyclohexane; C2-C16 aliphatic diamines that may be substituted with one or more alkyl groups, the C36 diamines originating from fatty acid dimers known under the name Priamine; 2,5-bis(aminomethyl)furan and 2,5-bis(aminomethyl)tetrahydrofuran; para-phenylenediamine; meta-phenylenediamine; and the ethoxylated diamines known under the name Jeffamine or Elastamine (polyetherdiamine comprising ethers of ethylene glycol and/or of propylene glycol and/or of tetramethylene glycol).

The majority of these monomers are commercially available and may be biobased. These monomers are particularly advantageous because they are able to confer a semi-crystalline character on the polyamides of the invention.

The diamine monomers of formula V may be chosen from 2,5-bis(aminomethyl)furan and 2,5-bis(aminomethyl)tetrahydrofuran. In the particular embodiment in which the diamine monomer of formula V is 2,5-bis(aminomethyl) tetrahydrofuran, the compound in question may be the cis or trans stereoisomer or a mixture thereof.

These advantageously biobased diamines may be synthesized, for example for 2,5-bis(aminomethyl)furan, by nitrilation of 2,5-furandicarboxylic acid followed by a selective hydrogenation, and a hydrogenation of the furan ring of 2,5-bis(aminomethyl)furan to prepare 2,5-bis(aminomethyl) tetrahydrofuran.

Dicarboxylic acid comonomers that may be used according to the invention, may be, for example, oxalic acid, glutaric acid, adipic acid, suberic acid, azelaic acid, sebacic acid, 1,12-dodecanedioic acid; 1,3- or 1,4-cyclohexanedicarboxylic acid; 1,3- or 1,4-phenylenediacetic acid; 1,3- or 1,4-cyclohexanediacetic acid; isophthalic acid; 5-hydroxyisophthalic acid; terephthalic acid; 4,4'-benzophenonedicarboxylic acid; 2,6-naphthalenedicarboxylic acid; and 5-t-butylisophthalic acid, alkali metal salts (Li, Na or K) of sulpho-5-isophthalic acid, and the C36 fatty acid dimers known under the name Pripol.

These comonomers are commercially available and may be biobased.

The diamine comonomers (different from the monomers of formula V) may be chosen, for example, from: hexamethylenediamine; 1,4-diaminobutane; 1,5-diaminopentane; 2-methyl-1,5-diaminopentane; 2-methylhexamethylenediamine; 3-methylhexamethylenediamine; 2,5-dimethylhexamethylenediamine; 2,2-dimethylpentamethylenediamine; 1,7-diaminoheptane, 1,8-diaminooctane; 1,9-diaminononanediamine; 2-methyl-1,8-octanediamine, 5-methylnonanediamine, 1,10-diaminodecane; 1,11-diaminoundecane; 1,12-diaminododecane; 2,2,4- and 2,4,4-trimethylhexamethylenediamine; 2,2,7,7-tetramethyloctamethylenediamine; meta-xylylenediamine; para-xylylenediamine; isophoronediamine; 4,4'-diaminodiphenylmethane; 4,4'-methylenebis(cyclohexylamine); C2-C16 aliphatic diamines that may be substituted with one or more alkyl groups, the C36 diamines originating from fatty acid dimers known under the name Priamine; 2,5-bis(aminomethyl)furan and 2,5-bis((aminomethyl)tetrahydrofuran; para-phenylenediamine; meta-phenylenediamine; and the ethoxylated diamines known under the name Jeffamine or Elastamine (polyetherdiamine comprising ethers of ethylene glycol and/or of propylene glycol and/or of tetramethylene glycol).

These comonomers are commercially available and may be biobased.

The lactam or amino acid comonomers may be chosen, for example, from caprolactam, 6-aminohexanoic acid; 5-aminopentanoic acid, 7-aminoheptanoic acid, 9-aminononanoic acid, 11-aminoundecanoic acid and dodecanolactam.

These comonomers are commercially available and may be biobased.

Several processes for manufacturing the polyamide according to the invention may be envisaged, as described previously. These processes may be continuous or batch processes.

A first process proposed by the present invention is a process for preparing the polyamide according to the invention, which comprises a polycondensation reaction between:

at least one dicarboxylic acid of formula IV below:

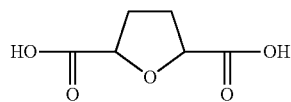

(IV)

at least one diamine of formula V below:

(V)

with R as defined above.

According to one preferred embodiment of the invention, at least one diamine of formula V is biobased according to standard ASTM D6866.

According to one preferred embodiment of the invention, dicarboxylic acid of formula IV is biobased according to standard ASTM D6866.

This first process is similar in its conditions to the standard process for preparing polyamide of the type obtained from dicarboxylic acids and diamines, in particular the process for manufacturing polyamide 66 from adipic acid and hexamethylenediamine or the process for manufacturing the polyamide MXD6 by direct amidation starting with molten adipic acid and meta-xylylenediamine. The processes for manufacturing polyamide 66 and MXD6 are known to those skilled in the art. The process for manufacturing polyamide of the type obtained from dicarboxylic acids and diamines generally uses as starting material a salt obtained by mixing, in stoichiometric amount, generally in a solvent such as water, of a diacid with a diamine. Thus, in the manufacture of poly(hexamethyleneadipamide), adipic acid is mixed with hexamethylenediamine generally in water to obtain hexamethylenediammonium adipate, which is more commonly known as Nylon salt or "N Salt".

Thus, in the manufacture of the polyamide according to the invention, the dicarboxylic acid of formula IV is mixed with the diamine of formula V, generally in water to obtain a salt of the two monomers. As explained above, these monomers may comprise up to 50 mol %, preferably up to 30 mol % and even more preferentially up to 15 mol % of other comonomers as described previously.

The salt solution is optionally concentrated by partial or total evaporation of the water.

The polyamide is obtained by heating at high temperature and high pressure of an aqueous solution of the monomers (for example a salt solution as described above), or of a liquid comprising the monomers, to evaporate the water and/or the liquid while at the same time avoiding the formation of a solid phase.

The polymerization medium may also comprise additives such as antifoams, chain limiters (monofunctional molecules capable of reacting with the acid and/or amine functions), branching agents (i.e. molecules bearing at least three functional groups chosen from carboxylic acid and amine groups), catalysts, stabilizers (with respect to UV, heat or light), matting agents (for instance $TiO_2$, etc.), lubricants and pigments.

The polycondensation reaction is generally performed at a pressure of about 0.5-3.5 MPa (0.5-2.5 MPa) and at a temperature of about 180-320° C. (215-300° C.). The polycondensation is generally continued in the melt at atmospheric or reduced pressure so as to achieve the desired degree of progress.

The polycondensation product is a molten polymer or prepolymer. At this stage, the reaction medium may comprise a vapour phase consisting essentially of vapour of the elimination product, in particular water, which may have been formed and/or vaporized.

This product may be subjected to steps for separating out the vapour phase and for finishing in order to achieve the desired degree of polycondensation. The separation of the vapour phase may be performed, for example, in a device of cyclone type for a continuous process. Such devices are known.

The finishing consists in maintaining the polycondensation product in molten form, at a pressure in the region of atmospheric pressure or at a reduced pressure, for a time that is sufficient to achieve the desired degree of progress. Such an operation is known to those skilled in the art. The temperature of the finishing step is advantageously greater than or equal to 200° C. and in all cases greater than the solidification temperature of the polymer. The residence time in the finishing device is preferably greater than or equal to 5 minutes.

In the case of processes that are more suited to the polymerization of the polyamide MXD6, the two monomers are introduced into the reactor without proceeding via a salification phase: this is then referred to as the direct amidation process. The reaction in this case is generally performed at atmospheric pressure.

The polycondensation product may also undergo a post-condensation step in solid or liquid phase. This step is known to those skilled in the art and makes it possible to increase the degree of polycondensation to a desired value.

The polyamide obtained via the process of the invention in molten form may thus be formed directly or may be extruded and granulated, for an optional post-condensation step and/or for subsequent forming after melting.

A second process for preparing the polyamide according to the invention is a "diester aminolysis" process, i.e. at least one diamine of formula V as described previously is reacted with at least one diester of formula IV', preferably a methyl, ethyl, propyl or butyl diester of the carboxylic acid of formula IV as described previously. A similar process applied to different monomers is moreover described in the publication from Ulrich Fehrenbacher in Chemie Ingenieur Technik (Polymere) 2009, 81, 11, 1829-1835. According to one preferred embodiment of the invention, at least one diamine of formula V is biobased according to standard ASTM D6866. According to one preferred embodiment of the invention, at least one diester of formula IV' is biobased according to standard ASTM D6866.

The present invention also envisages another process for preparing the polyamide according to the invention, the said process comprising the reaction between at least one diamine of formula V as described previously and at least one dinitrile of formula IV" as described earlier on in the description. A similar process applied to different monomers is moreover described in WO2001/079327. According to one preferred embodiment of the invention, at least one diamine of formula V is biobased according to standard ASTM D6866. According to one preferred embodiment of the invention, at least one dinitrile of formula IV" is biobased according to standard ASTM D6866.

Lastly, the present invention also provides another process for preparing the polyamide according to the invention, said process comprising reacting at least one diamine of formula V as described above with at least one acid dichloride of formula IV''' as described earlier on above in the description, this reaction generally being carried out in solution or by interfacial polymerization. This is a synthesis process known to the skilled person and used especially for the synthesis of aromatic polyamides such as Kevlar®.

The polyamide may be used to make articles by moulding, injection-moulding, injection/blow-moulding, extrusion/blow-moulding, extrusion or spinning. The articles may thus take the form of mouldings or extrudates, films, yarns, fibres or filaments.

The articles thus obtained have applications in numerous fields such as technical plastics (motor vehicle, E&E, consumer goods), industrial yarns, the textile industry, packaging, etc.

The present invention also relates to compositions comprising at least the polyamide of the invention, and optionally reinforcing fillers and/or various additives.

Such a composition preferentially comprises from 1% to 80% by weight of the polyamide according to the invention, relative to the total weight of the composition. This composition may especially comprise other types of polymer, especially such as thermoplastic polymers.

The composition may also comprise reinforcing or bulking fillers. Reinforcing or bulking fillers are fillers conventionally used for making polyamide compositions. Mention may be made especially of reinforcing fibrous fillers, such as glass fibres, carbon fibres or organic fibres, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, for instance dimethacrylate particles, glass beads or glass powder.

The composition according to the invention may comprise between 5% and 60% by weight of reinforcing or bulking fillers and preferentially between 10% and 40% by weight, relative to the total weight of the composition.

The composition according to the invention comprising the polyamide as defined previously may comprise at least one impact modifier, i.e. a compound that is capable of modifying the impact strength of a polyamide composition. These impact modifier compounds preferentially comprise functional groups that are reactive with the polyamide. According to the invention, the term "functional groups that are reactive with the polyamide" means groups that are capable of reacting or of interacting chemically with the acid or amine functions of the polyamide, especially by covalency, ionic or hydrogen interaction or van der Waals bonding. Such reactive groups ensure good dispersion of the impact modifiers in the polyamide matrix. Good dispersion is generally obtained with impact modifier particles that have a mean size of between 0.1 and 2 μm in the matrix.

The composition according to the invention may also comprise additives usually used for the manufacture of polyamide compositions. Thus, mention may be made of lubricants, flame retardants, light and/or heat stabilizers, plasticizers, nucleating agents, UV stabilizers, catalysts, antioxidants, antistatic agents, dyes, matting agents, moulding additives or other conventional additives.

These fillers and additives may be added to the modified polyamide via usual means suited to each filler or additive, for instance during the polymerization or mixed in the melt. The polyamide compositions are generally obtained by mixing the various compounds included in the composition without heat or in the melt. The process is performed at more or less high temperature, at more or less high shear depending on the nature of the various compounds. The compounds may be introduced simultaneously or successively. An extrusion device in which the material is heated, and then melted and subjected to a shear force, and conveyed, is generally used.

It is possible to mix all the compounds in the molten phase in a single operation, for example during an extrusion operation. It is possible, for example, to perform a mixing of granules of the polymer materials, to introduce them into the extrusion device in order to melt them and to subject them to a more or less high shear. According to particular embodiments, premixing, optionally in the melt, of some of the compounds may be performed before preparation of the final composition.

The composition according to the invention, when it is prepared using an extrusion device, is preferably conditioned in the form of granules. The granules are intended to be formed using processes involving melting to obtain articles. The articles are thus constituted by the composition. According to one common embodiment, the modified polyamide is extruded in the form of rods, for example in a twin-screw extrusion device, which are then chopped into granules. The pieces are then made by melting the granules produced above and feeding the composition in melt form into forming devices, for example injection-moulding devices.

The composition according to the invention allows the preparation of articles obtained by forming the said composition, for example by extrusion, especially extrusion of plates, sheets or films, moulding, especially injection-moulding, rotary moulding, blow-moulding, especially injection/blow-moulding, or spinning. Articles that may be mentioned include those used in the motor vehicle or electronics and electrical industry, for example.

The articles obtained may especially be mouldings, blow-mouldings or extrudates, yarns, fibres, filaments or films.

The polyamide according to the invention has many advantages. First, it is advantageously at least partly biobased, which makes it possible to reduce its environmental footprint. It also has very advantageous mechanical properties, a high molar mass and, depending on the diamine used, it may be semi-crystalline. The polyamide of the invention may, finally, replace the polyamides conventionally used in fields such as technical plastics (motor vehicle, E&E, consumer goods), industrial yarns, the textile industry, packaging, etc.

The process of the invention also has many advantages. In particular, when it is a process of "salt" type it is very easy to control the stoichiometry between the dicarboxylic acid and the diamine. Furthermore, the process does not generate any degradation products such as furan, which is a highly toxic product. In addition, the preparation of the polyamide according to the invention may be performed using industrial equipment usually used in factories for manufacturing polyamides of the type obtained from dicarboxylic acids and diamines, especially polyamide 66, and therefore does not require any additional industrial investment.

Other details or advantages of the invention will emerge more clearly in the light of the examples given below.

EXAMPLES

Melting temperature (Tm, and associated enthalpy □Hm), crystallization temperature (Tc), and glass transition (Tg) are determined by Differential Scanning calorimetry (DSC) using a Perkin Elmer Pyris 1, with heating and cooling rate of 10° C./min.

Thermal stability is evaluated by Thermo-Gravimetric Analysis (TGA) under nitrogen using a Perkin Elmer TGA7, by heating a 10 mg sample from 40° C. to 600° C. at a heating rate of 10° C./min. Degradation temperature corresponding to the weight loss of 1%, 3% and 10% are recorded and respectively named Tdec1%, Tdec3% and Tdec10%.

1H NMR analysis of polyamide is achieved using a Bruker AV500 in 1,1,1,3,3,3-Hexafluoro-2-propanol-d2 or $D_2SO_4$ if deuterated HFIP is not a good solvent.

Amine end-groups (AEG) and carboxylic end-groups (CEG) concentrations (in mmol/kg) are determined by titration. We calculate the average molecular weight in number $Mn_{EG}$ from end-grous concentration by $Mn_{EG}=2000000/(AEG+CEG)$.

Viscosity Index (VI, in mL/g) is measured in formic acid as a solvent according to ISO307.

Example 1: Preparation of a Polyamide from 2,5-Furandicarboxylic Acid (FDCA) and Hexamethylenediamine A salt of 2,5-furandicarboxylic acid (FDCA) and of hexamethylenediamine is prepared by adding 2 g of FDCA (0.0128 mol) to 4.59 g of aqueous 32.5% hexamethylenediamine solution (0.0128 mol). Exothermicity is produced during the salification, and the reaction medium is then maintained at 50° C. for 2 hours and becomes perfectly clear. The salt is recovered and then analysed by thermogravimetric analysis coupled to an infrared detector: this involves heating the salt at 10° C./min. A substantial evolution of $CO_2$ and of furan is detected at and above 245° C., i.e. during the melting of the salt 6FDCA, which is a sign of degradation of the 2,5-furandicarboxylic acid units. It is therefore not possible to prepare polyamides of high molecular mass via this route.

Examples 2: Preparation of Polyamides from THFDCA and Diamines

A salt of hexamethylenediamine and of 2,5-tetrahydrofurandicarboxylic acid (monomer noted THFDCA or TF) is prepared by mixing at room temperature the monomers in stoichiometric amount (2 g of TF (0.0125 mol) and 1.45 g of hexamethylenediamine) in ethanol. The reaction medium is heated at 70° C. for 2 hours. After cooling, the dry salt is recovered by filtration and drying. This is the salt named 6TF.

A salt of 1,10-diaminodecane and of 2,5-tetrahydrofurandicarboxylic acid is prepared by mixing at room temperature the monomers in stoichiometric amount (2 g of TF (0.0125 mol) and 2.153 g of 1,10-diaminodecane) at 20% in water. The reaction medium is heated at 70° C. for 2 hours. After cooling, the dry salt is recovered by filtration and drying. This is the salt named 10TF.

Each salt is heated above its melting point and the amidation reaction takes place. The polyamides obtained have satisfactory thermal characteristics.

Example 3: Synthesis of Homopolyamides by Diester Route

Dimethyl 2,5-tetrahydrofuranoate cis/trans 90/10 (named dmTHFDCA cis/trans 90/10) is synthesized as follows. In a 3 L flask equipped with a reflux condenser and a thermometer furan-2,5-dicarboxylic acid (FDCA) (200 g, 1.28 mol), $H_2SO_4$ (98%, 90 ml) were dissolved in 1.4 L of methanol. The reaction mixture was stirred under reflux for 22 h. After cooling to R.T, the mixture was concentrated in vacuum and the residue was dissolved in 1.5 L of DCM. The obtained solution was washed by water (2×400 ml), saturated $NaHCO_3$ solution (2×300 ml), and brine (2×300 ml). The organic layer was dried and concentrated in vacuum to give 203 g of white solid (86% yield), and the solid was used for next step without further purification.

In a 5 L Parr reactor the white solid obtained (250 g, 1.36 mol), Pd/C (10%, 25.0 g) were suspended in 2.5 L of methanol. The reaction mixture was stirred at 50° C. under an atmosphere of hydrogen at 20 bar, and monitored by LC/MS. When the reaction is completed the mixture was filtered through silica gel and the filtrate was concentrated in vacuo and distilled under reduced pressure to give 228 g of colorless oil (85° C./50 Pa, 89% yield).

2,5-tetrahydrofurandicarboxylic acid cis/trans 90/10 (named THFDCA) is synthesized as follows. In a 50 ml round-bottomed flask equipped with a reflux condenser the dmTHFDCA (1 g, 5.3 mmol) was dissolved in 1 ml of TFA and 5 ml of water. The mixture was heated at 100° C. and monitored by LC-MS. When the reaction is completed the mixture was concentrated under vacuum to give 0.78 g of white solid (92% yield). If necessary the product would be further purified by recrystallization.

We synthesize polyamides starting from dimethyl 2,5-tetrahydrofuranoate cis/trans 90/10 (named dmTHFDCA cis/trans 90/10) and a stoichiometric amount of a diamine. Diamines evaluated are: hexamethylene diamine, 1,10-diaminodecane, 1,4-diaminobutane, meta-xylylene diamine, isophorone diamine, 1,3-bis(aminomethyl)cyclohexane and 4,4'-Methylenebis(2-methylcyclohexylamine) mixture of isomers all supplied by Sigma-Aldrich.

The same method is used to synthesize all the different polyamides. Here is described the method used for the synthesis of PA 10TF.

In a glass reactor is introduced 16,002 g of dmTHFDCA cis/trans 90/10 prepared by ourselves according to the procedure described (purity 98%, 0.083 mol) and 14,666 g of 1,10-diaminodecane (purity 98%, 0.083 mol). Nitrogen blanket is then used and the monomers are stirred using a mechanical stirrer. The glass reactor is immersed in a heating bath regulated at 80° C. and then heated to final temperature (230° C.) with heating rate of 1.5° C./min. Methanol produced during the reaction between the diester and the diamine (beginning of the appearance of boiling in the reaction mixture when bath is at 90° C.) is removed by distillation. When the reactor is at final temperature, pressure in the glass reactor is decreased to about 60 mbar and maintained under vacuum during 30 minutes. Nitrogen is introduced to come back to atmospheric pressure, stirring is stopped and the glass reactor removed from heating bath to cool the reaction mixture. A yellowish transparent solid is recovered.

1H NMR analysis in deuterated HFIP confirms the reaction between THFDCA and 1,10-diaminodecane. Thermal properties analysis shows that the PA 10TF$_{cis/trans90/10}$ is an amorphous solid with Tg=47° C. and has a very good thermal stability up to more than 280° C., giving a broad processing window between Tg and Tdec1%.

A similar method is used for the synthesis of polyamides with dmTHFDCA cis/trans 90/10 and various diamines. Thermal properties of the homopolyamides are reported in Table 1.

In any case, all homopolyamides are all yellowish transparent amorphous solids with Tg up to 162° C., depending on the rigidity of the diamine used. They can compete with other existing commercial amorphous polyamides.

Example 4: Synthesis of PA 66/6TF Copolyamides Using Salt Route

We use a sample of THFDCA cis/trans 95/5 for the synthesis of PA 66/6TF 95/5, 90/10 and 80/20 mol/mol. Polymerization of theses copolyamides is achieved using a classical PA 66 synthesis process: we prepare an aqueous salt composed with diacids mixtures (adipic acid and THFDCA) and hexamethylene diamine at a concentration of 52 wt.-% in water and 70° C., we concentrate the aqueous salt up to 70 wt.-% under atmospheric pressure by removing water by heating, we then heat the reactor under 17.5 bar pressure (distillation of water under pressure), we depressurize to atmospheric pressure when the temperature of the reaction mixture reaches 250° C. and we finish the reaction at 272° C. during 30 min at atmospheric pressure. The copolyamides are extruded from the reactor under pressure, cooled in a cold water bath to get a strand and then pelletized.

For PA 66/6TF 95/5 mol/mol, we started the reaction by mixing 142.62 g (0.544 mol) of Nylon 66 salt (stoichiometric salt of adipic acid and hexamethylene diamine), 11.78 g (0.0330 mol) of hexamethylene diamine at 32.5% in water, 4.57 g (0.029 mol) of THFDCA, 130 g of water and 2 g of an anti-foaming agent.

For PA 66/6TF 90/10 mol/mol, we started the reaction by mixing 134.48 g (0.513 mol) of Nylon 66 salt (stoichiometric salt of adipic acid and hexamethylene diamine), 20.50 g (0.057 mol) of hexamethylene diamine at 32.5% in water, 9.12 g (0.057 mol) of THFDCA, 124 g of water and 2 g of an anti-foaming agent.

For PA 66/6TF 80/20 mol/mol, we started the reaction by mixing 118.96 g (0.453 mol) of Nylon 66 salt (stoichiometric salt of adipic acid and hexamethylene diamine), 40.55 g (0.113 mol) of hexamethylene diamine at 32.5% in water, 18.13 g (0.113 mol) of THFDCA, 109 g of water and 2 g of an anti-foaming agent.

Properties of these copolyamides are reported in Table 2.

The more THFDCA is included in PA 66 chains, the lower the Tm, Hm and Tc. We generally use comonomers to decrease the crystallization kinetics to get molded part having a better surface aspect or for fiber spinning. As a comparison, a PA 66/6I 80/20 mol/mol (I=isophthalic acid) synthesized using the same method 80/20 mol/mol has the following thermal properties: Tm=240° C., Tc=193° C. and Tg=76° C. PA 66 copolyamides having THFDCA or

TABLE 1

Properties of homopolyamides synthesized using dmTHFDCA cis/trans 90/10.

| | Diamine | Tg °C. | Tdec1% °C. | Tdec3% °C. | Tdec10% °C. |
|---|---|---|---|---|---|
| PA 4TF | 1,4-diamino butane | 92 | 291 | 327 | 362 |
| PA 6TF | Hexamethylene diamine | 65 | 283 | 342 | 381 |
| PA 10TF | 1,10 diamino decane | 47 | 285 | 351 | 393 |
| PA 1,3-BAMCTF | 1,3-bis(aminomethyl) cyclohexane mixture of isomers | 133 | 296 | 336 | 377 |
| PA MXDTF | Meta-xylylene diamine | 117 | 306 | 335 | 355 |
| PA ISOTF | Isophorone diamine | 143 | N.D. | N.D. | N.D. |
| PA MBMCTF | 4,4'-Methylenebis(2-methylcyclohexylamine) mixture of isomers | 162 | N.D. | N.D. | N.D. | isophthalic acid as comonomers in similar content exhibit similar crystallization kinetics but THFDCA doesn't increase Tg.

We observed in our conditions that the cis/trans ratio of THFDCA changed from 95/5 to 82/18 mol/mol after the synthesis of PA 66/6TF 80/20 mol/mol.

TABLE 2

Properties of copolyamides synthesized using THFDCA cis/trans 95/5.

| | CEG meq/ kg | AEG meq/ kg | $Mn_{EG}$ g/mol | IV mL/g | Tm °C. | Hm | Tc °C. | Tg* °C. |
|---|---|---|---|---|---|---|---|---|
| PA 66 | 80 | 50 | 15390 | 129 | 262 | 65 | 220 | 67 |
| PA 66/6TF 95/5 mol/mol | 58.5 | 109 | 11940 | 105.9 | 255 | 63 | 211 | 69 |
| PA 66/6TF 90/10 mol/mol | 74.6 | 105 | 11140 | 97.7 | 250 | 56 | 206 | 68 |
| PA 66/6TF 80/20 mol/mol | 85 | 159.9 | 8170 | 74.1 | 237 | 45 | 188 | 66 |

*Determined at 40° C./min

Pellets of copolyamides are then dried during 16 h at 90° C. under vacuum before being submitted to injection molding to get specimens (bars 90×13×1.6 mm³) using a microextruder DSM MIDI 2000 with barrel temperature at 280° C. and mould temperature at 70° C.

Water absorption (RH100, 23° C., saturation) of the copolyamides is analyzed by placing the specimens in water at room temperature and by following the weight of the specimens until no change in weight is observed. Water absorption is determined by calculating (mf−mi)/mi, with mi=initial weight of the specimen before the test (dry), mf=final weight when the specimen is saturated with water.

PA 66/6THF 100/0, 95/5, 90/10 and 80/20 mol/mol respectively absorb 8.5 wt.-%, 9.9 wt.-%, 11 wt.-%, 14 wt.-% of water. It is higher than water absorption obtain with isophthalic acid as a comonomer. These copolymers would be interesting to increase the moisture absorption of textile fiber to bring higher comfort.

Example 5: Synthesis of Polyphthalamide Copolyamide Using Salt Route

We synthesized PA 6T/6TF 50/50 mol/mol and PA 10T/10TF 60/40 mol/mol using an aqueous salt route. We use a sample of THFDCA cis/trans 95/5 for these syntheses.

Polymerization of theses copolyamides is achieved using a classical PA 66 synthesis process with a few modifications: we prepare an aqueous salt composed with diacids mixtures (terephthalic acid and THFDCA) and diamine at a concentration of 52 wt.-% in water and 70° C., we close the reactor and we heat the reactor under 17.5 bar pressure (distillation of water under pressure), we depressurize to atmospheric pressure when the temperature of the reaction mixture reach 260° C. and we finish the reaction at 290° C. during 10 min at atmospheric pressure. The copolyamides are extruded from the reactor, cooled in a cold water bath to get a strand and then pelletized.

For PA 6T/6TF 50/50 mol/mol, we started the reaction by mixing 49.89 g (0.1767 mol) of Nylon 6T salt (stoichiometric salt of terephthalic acid and hexamethylene diamine), 66.61 g (0.1768 mol) of hexamethylene diamine at 30.85% in water, 28.34 g (0.177 mol) of THFDCA, 43.9 g of water and 2 g of an anti-foaming agent.

For PA 10T/10TF 60/40 mol/mol, we started the reaction by mixing 28.61 g (0.172 mol) of terephthalic acid, 50.39 g (0.287 mol) of 1,10-diaminodecane (purity=98%), 18.39 g (0.115 mol) of THFDCA, 86.62 g of water and 2 g of an anti-foaming agent.

TABLE 3

Properties of copolyamides synthesized using THFDCA cis/trans 95/5.

| | Tm °C. | Hm | Tc °C. | Tg* °C. |
|---|---|---|---|---|
| PA 6T/6TF 50/50 mol/mol | 273 | 10 | 231 | 104 |
| PA 10T/10TF 60/40 mol/mol | 241/256 | 29 | 222 | 84 |

*Determined at 10° C./min

THFDCA can be used in polyphthalamide to modulate the thermal properties of PA 6T and PA 10T.

What is claimed is:

1. A polyamide comprising the repeating unit of formula I below:

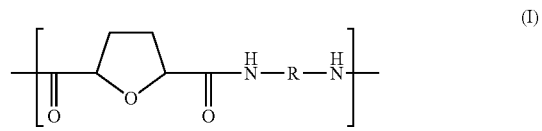

(I)

in which
R represents a covalent bond or a divalent hydrocarbon-based group chosen from saturated or unsaturated aliphatics, saturated or unsaturated cycloaliphatics, aromatics, arylaliphatics and alkylaromatics.

2. The polyamide according to claim 1, in which R is chosen from linear or branched alkyl groups having from 1 to 36 carbon atoms.

3. The polyamide according to claim 2, in which R is a linear alkyl group having from 4 to 14 carbon atoms.

4. The polyamide according to claim 1, in which R is chosen from: —(CH$_2$)$_4$—, —(CH$_2$)$_5$—, —(CH$_2$)$_6$—, —(CH$_2$)—CH(CH$_3$)—(CH$_2$)$_3$—, —(CH$_2$)$_{10}$— and —(CH$_2$)$_{12}$—.

5. The polyamide according to claim 1, in which R is a divalent aromatic hydrocarbon-based group comprising from 6 to 18 carbon atoms.

6. The polyamide according to claim 5, in which R is 1,4-benzene, 1,3-benzene or —(CH$_2$)-Ph-(CH$_2$)— in positions 1,3 and 1,4.

7. The polyamide according to claim 1, wherein said polyamide is a homopolyamide consisting entirely of the repeating unit of formula I.

8. The polyamide according to claim 1, wherein said polyamide is a copolymer comprising other repeating units different from the unit of formula I.

9. The polyamide according to claim 8, wherein the repeating units different from the unit of formula I comprise comonomers selected from dicarboxylic acids, diamines, amino acids and/or lactams.

10. The polyamide according to claim 8, wherein said polyamide is a copolymer chosen from the group consisting of: PA 6T/6TF, PA10T/10TF, PA6T/6TF/66, PA66/6TF, PA12T/12TF and PA610/6TF.

11. An article obtained from the polyamide according to claim 1, the said article being a molding or extrudate, yarn, fiber, filament, or film.

12. A composition comprising at least the polyamide according to claim 1, and optionally reinforcing fillers and/or various additives.

\* \* \* \* \*